United States Patent [19]

Lo

[11] Patent Number: 4,650,282

[45] Date of Patent: Mar. 17, 1987

[54] VISUAL PARALLAX COMPENSATION 3-D IMAGE STRUCTURE

[76] Inventor: Allen K. W. Lo, 5022 Hidden Branches Dr., Dunwoody, Ga. 30338

[21] Appl. No.: 809,041

[22] Filed: Dec. 16, 1985

[51] Int. Cl.[4] .................. G02B 27/22; G03B 35/08
[52] U.S. Cl. ............................ 350/130; 354/115; 352/58; 355/22; 350/167
[58] Field of Search ............... 350/130, 131, 320, 167; 354/115, 58, 81; 355/22

[56] References Cited

U.S. PATENT DOCUMENTS

| | | | |
|---|---|---|---|
| 3,953,869 | 4/1976 | Lo et al. | 354/115 |
| 4,037,950 | 7/1977 | Lo et al. | 354/115 |
| 4,120,562 | 10/1978 | Lo et al. | 350/130 |

Primary Examiner—Jon W. Henry

[57] ABSTRACT

An autostereoscopic picture is produced in which the width of the lineiform image bands of the stereo pairs within each lenticule are varied and adjusted to compensate for the visual parallax between the stereo pairs of the 3-D photograph according to the depth of field of each 3-D photograph in order to accommodate the interoccular distance and viewing angle of the eyes to improve the depth-of-field and 3-D effect of each 3-D photograph.

10 Claims, 8 Drawing Figures

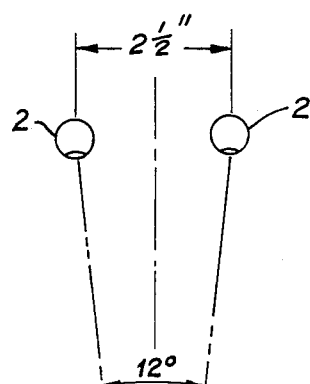
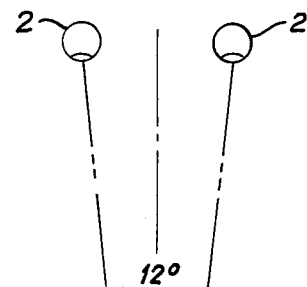
Fig 1
Fig 2
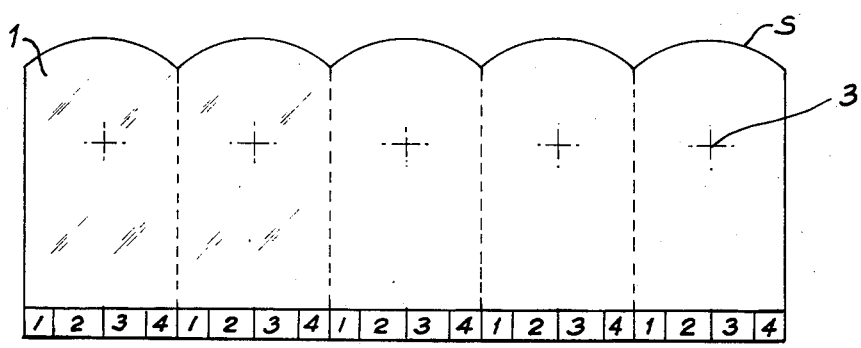
Fig 3

VISUAL PARALLAX COMPENSATION 3-D IMAGE STRUCTURE

BACKGROUND OF THE INVENTION

In lenticular type 3-D photography, a plurality of 2-D views of the scene are taken from a number of horizontally spaced vantage points and the series of 2-D images is then compressed and printed at the focal plane of each of the lenticules of the lenticular screen to form a 3-D composite image of the field.

In the past, each of the plurality of compressed 2-D lineiform image bands occupied an equal width in the lenticule. Several images may be printed within a single band or a single image may be printed within a single band. This has commonly been referred to as W/N wherein "W" is the width of each lenticule and "N" is the number of 2-D image bands to be used in the total composition.

When a person is viewing a 3-D photograph, the ideal situation is for the eyes to see a stereo pair of adjacent 2-D lineiform image bands. Thus in referring to FIG. 1, the eye should see image bands 1 and 2, 2 and 3 or 3 and 4 so that the proper parallax between the pair of 2-D images can be maintained in order to reconstruct a 3-D image that is in focus and not blurred. Parallax is the apparent shift in position of an element of an object field due to the relative change in position of the element and the place from which the element is viewed. Because the eyes are frequently not in the right position, either because of distance from the photograph or the angle at which the photograph is viewed, the eyes will not always see the stereo pair formed by the adjacent 2-D image bands. Frequently, the eyes will see stereo pairs formed by 2-D image bands 1 and 3, 2 and 4 or 1 and 4 (FIG. 1) according to the angle and the distance of viewing the 3-D photograph. When the eyes see a stereo pair where the lineiform image bands are not adjacent, they cannot fuse the two pairs of images together to form a solid image because of the excessive parallax.

In most lenticular screen type 3-D photographs, the maximum viewing angle of the lenticule of the print material is approximately 34° due to the optical limitations within the system. Consequently, each compressed lineiform 2-D image band will cover an angle of approximately 8½° of the viewing angle of the lenticule with a stereo pair formed by adjacent 2-D image bands covering approximately 17°. At a normal viewing distance of 12 inches, the eyes will cover an angle of approximately 12° of the viewing angle of the lenticule. Unless the 3-D photograph is held exactly at the center of both eyes and perpendicular to the eyes, the eyes will see a stereo pair formed by image bands 1 and 3 or 2 and 4.

PRIOR ART

U.S. Pat. No. 3,895,867 (Lo) discloses a method of making 3-D pictures where the lineiform image bands are of equal size in each lenticule. U.S. Pat. No. 4,120,562 (Lo) also discloses a method of producing 3-D pictures in which each lineiform image band is of equal width. The following U.S. patents of Lo are also disclosed as of interest: Nos. 3,953,869; 4,037,950; 4,063,265; 4,086,585.

SUMMARY OF THE INVENTION

It is an object of this invention to produce an autostereoscopic 3-D photograph of improved quality. In particular, it is an object to produce a photograph that can be viewed within a greater range of angles and distances in sharper focus (without blurring) than present 3-D photographs. It is a further object to produce a 3-D photograph of distant objects in which the parallax is increased in order to give more depth to the photograph.

It has been discovered that these objects can be obtained by varying the width of the stereo pairs of image bands in the lenticule. It has been taught in the past that the width of each of the image bands should be W/N (where "W" is the width of each lenticule and "N" is the total number of 2-D image bands used in the composition). The objects of this invention are obtained by varying the width of the lineiform image bands of the stereo pairs.

Basically, in this invention, the width of each image band is controlled to cover a different angle of the lenticule according to the parallax in each 3-D photograph to compensate for any visual parallax value in the stereo pair by increasing or decreasing the width of the image bands of the stereo pairs to maintain the proper parallax value to produce an in-focus 3-D image.

For 3-D photographs of normal or excessive parallax value, the width of the two center image bands (2 and 3, FIG. 3) are extended to a greater width to prevent the eyes from seeing image bands 1 and 3 or 2 and 4 or 1 and 4. This increases the maximum viewing angle. Only 1 and 2, 2 and 3, and 3 and 4 will be seen as stereo pairs to maintain the maximum allowable parallax so that the eyes can fuse the pair of stereo image bands together to reconstruct a solid 3-D image.

If the objective is to photograph objects that are far away where there is a lack of parallax, the width of the two center image bands (2 and 3, FIG. 5) may be reduced to cover a smaller viewing angle of the lenticule so that the eyes will see the stereo pairs formed by 1 and 3, 2 and 4 or 1 and 4. This increases the stereo base which in turn increases the parallax and maximizes the 3-D effect of the photograph.

BRIEF DESCRIPTION OF THE DRAWINGS

FIG. 1 illustrates the basic principles of viewing a lenticular stereoscopic picture.

FIG. 2 illustrates the principles of viewing a lenticular stereoscopic picture from an angle slightly off the perpendicular line between the center of the eyes and the picture.

FIG. 8 illustrates stereoscopic lenticular photographic material showing several lenticules.

DETAILED DESCRIPTION OF THE DRAWINGS

Figure 3:
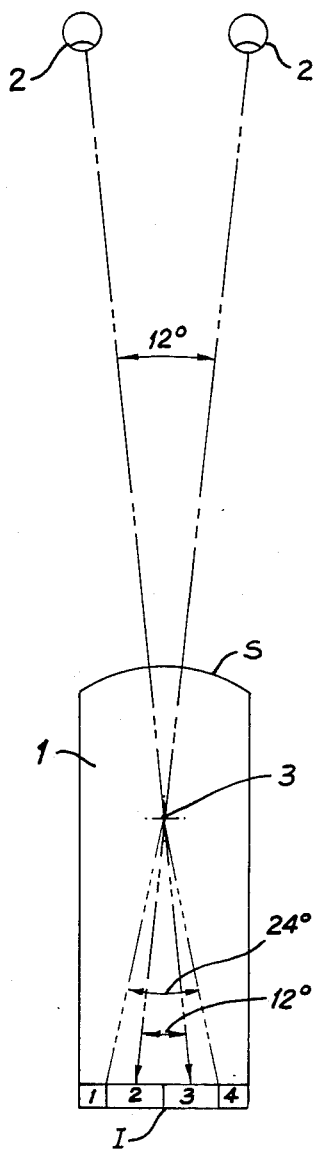
FIG. 3 illustrates the viewing of a lenticular stereoscopic picture in which the center stereoscopic image band pairs are wider than the outside pairs.

FIG. 1 illustrates the viewing of a stereoscopic lenticule 1 with a lenticular screen S. The lenticule has 2-D lineiform image bands I (1, 2, 3 and 4). Image bands 1 and 2, 2 and 3, and 3 and 4 constitute stereoscopic image pairs. These image bands I are formed on photosensitive material. FIG. 1 illustrates the human eyes 2 viewing the lenticule at a 90° angle to the center between the eyes. The eyes are shown to be 2½ inches apart which is the average distance between the eyes. The viewing angle covers approximately 12° when the eyes are 12 inches from the photograph. When the photograph is so held, the observer will see an image within stereoscopic image band pair 2 and 3 which covers a 17° angle which encompasses the 12° viewing angle. The eyes focus at the focal plane 3 in the lenticule.

FIG. 2 illustrates viewing of the lenticule when the photograph is 3° off the perpendicular line between the photograph and the center between the eyes. As the viewing is 12° and each lenticule is 8½° apart, the eyes will see nonadjacent stereoscopic image bands I (1 and 3) when the photograph is so held. This results in the photograph appearing blurred or not in sharp focus.

Figure 4:
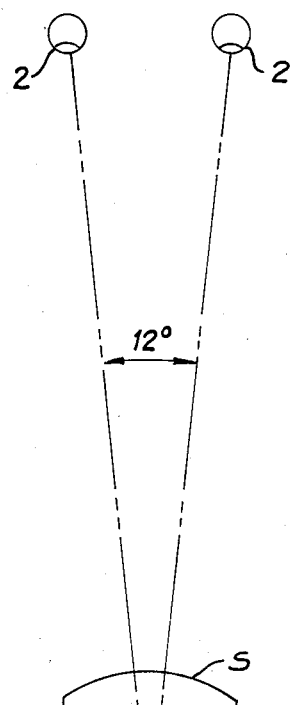
FIG. 4 illustrates the lenticule of FIG. 3 when held at a 3° angle off the perpendicular line between the center the eyes and the picture.
Figure 4:
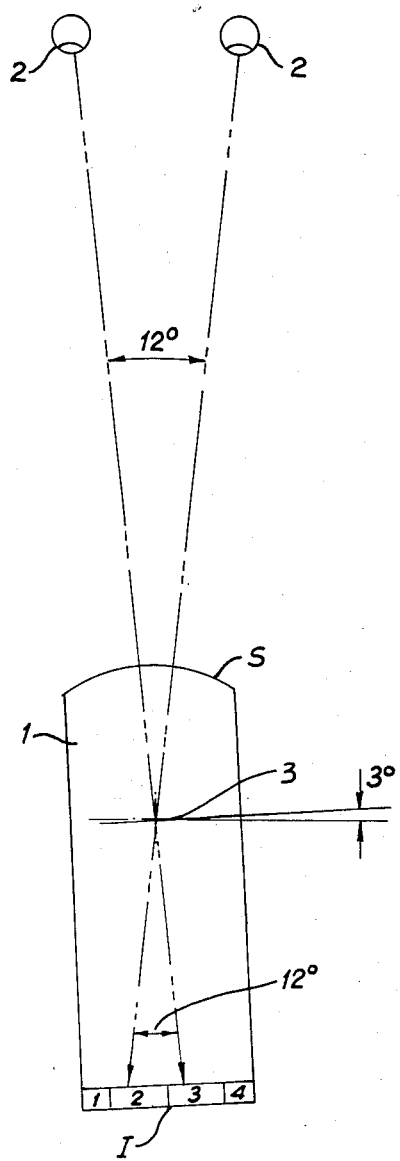

FIG. 3 illustrates viewing a lenticule in which the two center bands I (2 and 3) are of greater width than the two outside image bands (1 and 4). When the lenticule of FIG. 3 is held 3° off perpendicular, the viewer still sees an image in stereoscopic image band pairs I (2 and 3 in FIG. 4) as this lineiform image pair occupies 24° and the viewing angle is only 12°. Consequently, the photograph can be tilted or held off center to the eyes to a greater extent than photographs in which the stereoscopic image band pairs are of equal size. The extent to which the center lineiform image bands are of greater width than the outside image bands depends upon the particular effect desired. Generally, the stereoscopic image bands in the center would be from 1.25 to 3 times the width of the image bands on the outside of the lenticule. Preferably, the center image bands are from 1.5 to 2.5 times the width of the outside image bands. The extent to which the stereoscopic image pairs of the center should be of greater width than those on the outside is largely dependent upon the variation in the viewing angle that is likely to be encountered.

Figure 5:
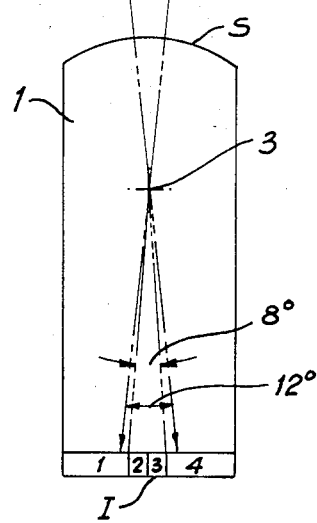
FIG. 5 illustrates viewing of a stereoscopic lenticular image band pair in which the outside pairs are wider than the inside pairs.

FIG. 5 illustrates a lenticule in which the inside stereoscopic image band I pair (2 and 3) are narrower than the outside pair (1 amd 4). The outside image bands are from 1.25 to 3 times the width of the inside image bands. As the normal viewing angle is 12°, the inside pair (2 and 3) cover an area less than 12°. This permits the eyes to see images in stereoscopic pair 1 and 4. This is desirable in situations where one wants to increase the parallax of the stereoscopic picture. It is especially applicable to photographing distant objects.

Figure 6:
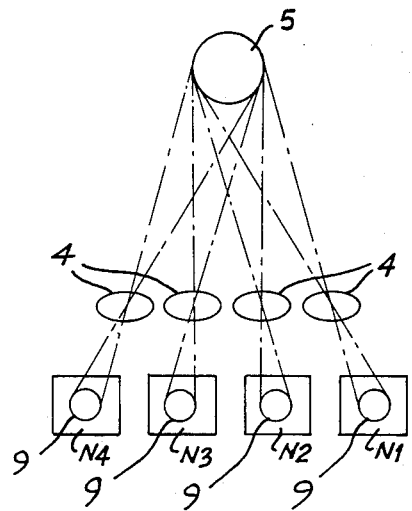
FIG. 6 illustrates the process of taking a stereoscopic picture.
Figure 7:
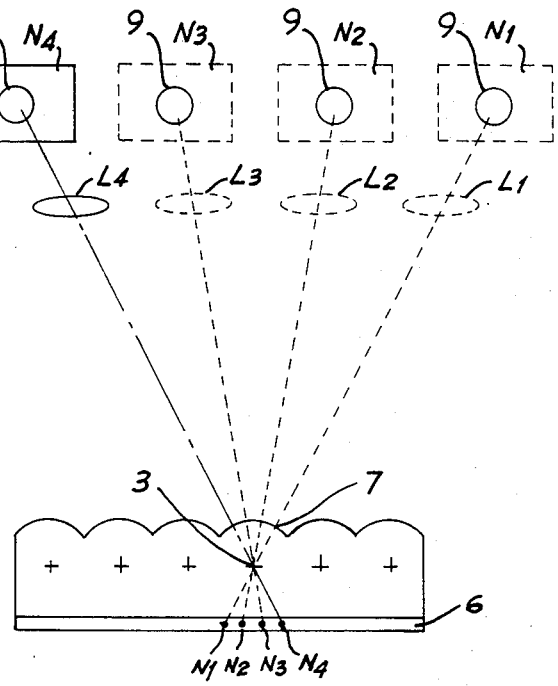
FIG. 7 illustrates the process of composing stereoscopic pictures onto lenticular photographic material.

The stereoscopic pictures of this invention are taken in the conventional manner as shown in FIG. 6. As illustrated in FIG. 6, a stereoscopic camera with four lenses 4 takes a photograph of a subject 5 with each of the lenses at a different horizontal position in relation to the subject 5. This produces four negatives (n1, n2, n3, n4) with images 9. These negatives are then processed as shown in FIG. 7 through enlarging lenses (L1, L2, L3, L4) which focus the image 9 on the photosensitive material 6 in the lenticule 1. The images are focused through the lenticular screen S to the focal point 3 and on to the photosensitive material to form the stereoscopic image bands I (n1, n2, n3, n4). If it is desired that the center image bands (2 and 3, FIG. 3) be wider than the outside image bands (1 and 4), this can be achieved in one of several ways. In the enlarging process (FIG. 7), the image from n2 can be projected onto image band 2 in a side-by-side relationship several times to fill the entire width of image band 2. Each on the images on image band 2 would then be identical. It is also possible to use a scanning technique (described in the prior art) to fill image band 2 with a series of images that are slightly different from each other. If it is desired to have a single image on each image band, the aperture of the enlarger can be opened so that a single image fills the image bands of wider width (2 and 3, FIG. 3). Conversely, if it is desired that stereoscopic image bands n1 and n4 be greater in width than n2 and n3, these same techniques may be utilized.

FIG. 8 illustrates a plurality of lenticules in which the center image bands of a pair (2 and 3) of each lenticule are wider than the outside image bands of a pair (1 and 4).

The lenticular film material in which the stereoscopic image pairs at the center are wider than on the outside offers a tremendous advantage in allowing the photographs to be viewed at wider viewing angles and distances. It is not necessary to view the lenticular screen from the same distance and position that the two dimensional frames were projected during composing. For example, in viewing lenticule S in FIG. 3, when there are a number of images in each image band (2 and 3), the eyes will focus on a particular image within this wider image band even though it is being viewed at a different angle than that from which the picture was taken as shown in FIG. 3. When there is a single image in the image band (2 and 3), this image will be seen even though the picture is being viewed from a tilted angle from the normal viewing position. The picture can be tilted or held at varying distances and not interfere with the quality of the pictures.

The pictures in which the outside images of the lenticule are wider than those on the inside permits achieving greater parallax on photographs of distant objects and in other cases where the photograph would otherwise have little depth.

I claim:

1. An image array formed on the photosensitive surface of lenticular print film, said image array consisting of a multiplicity of stereoscopic image pairs of lineiform image bands within each lenticule, with the image bands of each stereoscopic image pair nearest the center of the lenticule having a width substantially different from the image bands of the stereoscopic image pairs farther from the center.

2. The image array of claim 1 in which the image band of each stereoscopic pair is on each side of the center of the lenticule with the image bands of the stereoscopic image pairs nearest the center having a width substantially different from the image bands of the stereoscopic pairs farther from the center.

3. The image array of claim 2 in which the image bands of the stereoscopic pairs nearest the center of the lenticule have a width substantially greater than the width of the image bands of the stereoscopic pairs farthest from the center.

4. The image array of claim 2 in which the image bands of the stereoscopic pairs farthest from the center have a width substantially greater than the width of the image bands of the stereoscopic pairs nearest the center of the lenticule.

5. The image array of claim 3 in which the image bands of the stereoscopic pair nearest the center has a width of from 1.25 to 3 times the width of the bands of the stereoscopic image pair farthest from the center.

6. The image array of claim 4 in which the image bands of the stereoscopic pair farthest from the center has a width of from 1.25 to 3 times the width of the image bands of the stereoscopic pair nearest the center.

7. A method of forming an image array on the photosensitive surface of the lenticular print film with said image array consisting of a multiplicity of image bands of the stereoscopic pairs within each lenticule, with the image bands of each stereoscopic pair nearest the center of the lenticule having a width substantially different from the image bands of the stereoscopic pairs farthest from the center, which comprises projecting the images on negatives taken from a stereoscopic camera through projecting lenses so that the image bands are of unequal width as indicated above.

8. The method of claim 7 in which there are a plurality of identical images projected side by side in each image band comprises focusing the projecting lens on each image band with each negative so that the images in each image band are in a side-by-side relationship.

9. The method of claim 7 in which the projecting lens scans each image band and projects a series of images onto each image band.

10. The method of claim 7 in which the aperture of the projecting lens is adjusted so that a single image is projected onto each image band.

* * * * *